(12) United States Patent
Ham et al.

(10) Patent No.: US 8,384,864 B2
(45) Date of Patent: *Feb. 26, 2013

(54) SYSTEM FOR FORMING ALIGNMENT LAYER OF LIQUID CRYSTAL DISPLAY DEVICE AND OPERATION METHOD THEREOF

(75) Inventors: Yong Sung Ham, Gyeonggi-do (KR); Joung Won Woo, Gyeonggi-do (KR); Hyun Ho Kim, Seoul (KR); Young Kwon Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1472 days.

This patent is subject to a terminal disclaimer.

(21) Appl. No.: 11/646,267

(22) Filed: Dec. 28, 2006

(65) Prior Publication Data

US 2007/0153185 A1 Jul. 5, 2007

(30) Foreign Application Priority Data

Dec. 29, 2005 (KR) .................. 10-2005-0133667

(51) Int. Cl.
*G02F 1/1337* (2006.01)

(52) U.S. Cl. .................. 349/126; 349/123; 349/124

(58) Field of Classification Search ........... 349/123–127
See application file for complete search history.

(56) References Cited

U.S. PATENT DOCUMENTS

| | | | | |
|---|---|---|---|---|
| 7,615,261 B2 * | 11/2009 | Ham et al. | ...... | 428/1.1 |
| 2006/0050222 A1 * | 3/2006 | Park | ...... | 349/187 |
| 2006/0139538 A1 * | 6/2006 | Park | ...... | 349/124 |
| 2007/0153184 A1 * | 7/2007 | Ham et al. | ...... | 349/126 |

FOREIGN PATENT DOCUMENTS

| | | |
|---|---|---|
| JP | 08-313913 | 11/1996 |
| JP | 10-319401 | 12/1998 |
| KR | 1019980057653 A | 9/1998 |
| KR | 1020010066366 A | 7/2001 |
| KR | 1020050022265 A | 3/2005 |

* cited by examiner

*Primary Examiner* — Dung T. Nguyen
(74) *Attorney, Agent, or Firm* — Morgan, Lewis & Bockius LLP

(57) ABSTRACT

A system for forming an alignment layer of a liquid crystal display device includes a rubbing apparatus to perform a rubbing process on the alignment layer on a substrate, a pre-treatment apparatus to thermally treat the substrate, and a light irradiation apparatus to irradiate light onto the substrate. The rubbing apparatus, the pre-treatment apparatus and the light irradiation apparatus are constructed in an in-line type.

9 Claims, 16 Drawing Sheets

RUBBING DIRECTION

SYSTEM FOR FORMING ALIGNMENT LAYER OF LIQUID CRYSTAL DISPLAY DEVICE AND OPERATION METHOD THEREOF

This application claims the benefit of the Korean Application No. 2005-133667 filed in Korea on Dec. 29, 2005, which is hereby incorporated by reference.

BACKGROUND OF THE INVENTION

1. Field of the Invention

The present invention relates to a liquid crystal display (LCD) device, and more particularly, to a system for forming an alignment layer of an LCD device and an operation method thereof.

2. Background of the Related Art

In general, cathode ray tubes (CRTs) have been utilized in display devices for displaying image information, but they usually are large and are heavy. With the development of electronic industries, display devices are not only utilized for televisions (TV) and monitors, but also are utilized in personal computers, wireless terminals, vehicle instrument panels, electronic display boards, and the like. Now, with the development of information communication technology, the market has a great demand for the display devices that are capable of processing and displaying large capacity image information. Such display devices are also required to have light weight, thin profile, a high luminance, a large-sized screen, low power consumption, and a low price. For this reason, liquid crystal display (LCD) devices have attracted considerable attention. The LCD device exhibits an excellent resolution among the flat display devices as well as a rapid response time in implementing a moving picture as compared to that of the CRT.

One LCD that enjoys a great popularity is a twisted nematic (TN) mode LCD. In the TN mode LCD, electrodes are formed on two substrates, respectively, and liquid crystal directors are aligned and twisted by 90°, so that a driving voltage is applied to the electrodes to drive the liquid crystal directors. However, the TN mode LCD has the disadvantage of a narrow viewing angle. Recently, many efforts have been made to improve the TN mode LCD. For example, an in-plane switching (IPS) mode LCD and an optically compensated birefringence (OCB) mode LCD have been proposed. The IPS mode LCD generates a horizontal electric field to drive liquid crystal molecules in a horizontal state with respect to the substrates by forming two electrodes on the same substrate and applying a voltage between the two electrodes. In other words, the longer axis of the liquid crystal molecule does not stand up with respect to the substrate. For this reason, the IPS mode LCD has a small variation in the birefringence of liquid crystal according to a visual direction and thus has an excellent viewing angle characteristic compared with the TN mode LCD.

FIG. 1 is a flowchart schematically illustrating a method, including Steps S100 to S180, for fabricating a related art LCD. As illustrated in FIG. 1, upper and lower substrates are prepared at Step S100. The upper substrate includes a color filter, and the lower substrate includes matrix-type pixels with thin film transistors (TFTs). At Step S110, the substrates are cleaned to remove foreign substances thereon. At S120, a polyimide material is printed on a top surface of each substrate to form an alignment layer using an apparatus for printing the alignment layer. At Step S130, high-temperature heat is applied to the polyimide material, thereby drying and hardening solvent of the alignment layer. At Step S140, a surface of the hardened alignment layer is rubbed in one direction using a rubbing apparatus. At Step S150, an adhesive seal pattern is formed at an edge of the upper substrate at a region except a liquid crystal injection hole, and spacers are then dispersed on the lower substrate. At Step S160, the lower and upper substrates are bonded together with an accuracy of several micrometers to prevent light leakage. At Step S170, the bonded substrates are cut into unit cells by a cutting process, which is performed for cutting the bonded two substrates into a plurality of unit cells with desired size. This cutting process includes a scribing process for forming lines on the upper and lower substrates and a breaking process for dividing the scribed substrates into unit cells by applying an impact thereon. At Step S180, liquid crystal is injected through the injection hole into a gap between the lower and upper substrates, and then the injection hole is sealed to complete a desired LCD.

A liquid crystal dispensing method may be used instead of the liquid crystal injecting method described above. In this case, the physical properties of the liquid crystal are changed by a molecular arrangement state thereof, thereby making a difference in a response to an external force such as an electric field. Because of the characteristics of the liquid crystal molecule, a control technique for an arrangement state of the liquid crystal molecule is essential for the study on the physical properties of the liquid crystal and the construction of the LCD as well. Specifically, a rubbing process for uniformly aligning the liquid crystal molecules in one direction is essential for a normal driving of the LCD and a uniform display characteristic thereof. A related art alignment layer forming process for determining an initial alignment direction of liquid crystal molecules will now be described below in detail.

The forming process of an alignment layer includes a process of depositing a high polymer thin layer and a process of aligning an alignment layer in one direction. The alignment layer may be made mainly of an organic material of polyimide series and may be aligned mainly through a rubbing process. The organic material of polyimide series is deposited on a substrate, and then a solvent thereof is volatilized at about 60~80° C. After that, the deposited material is hardened at about 80~200° C. to form an alignment layer. The alignment layer is rubbed in one direction with a roller having a rubbing cloth such as velvet wound therearound to form an alignment direction thereof. The rubbing process enables an easy and stable alignment process and is thus suitable for mass production of the LCD.

However, the rubbing process may bring about a problem when the rubbing cloth becomes defective during the rubbing operation. Specifically, the rubbing process is performed such that the rubbing cloth and the alignment layer are in a direct contact. Thus, such a rubbing process may cause the contamination of a liquid crystal cell due to particles, damage to a TFT due to an electrostatic discharge, and a non-uniform alignment of liquid crystal in a wide-screen LCD, thereby decreasing the production yields of the LCD. Moreover, an additional cleaning process is needed after the rubbing process.

FIGS. 2A and 2B are a sectional view and a plan view schematically illustrating an alignment state of liquid crystal around a stepped portion of an electrode pattern such as a pixel electrode and a common electrode in the related art LCD. Recently, an IPS mode LCD with an improved viewing angle and an IPS mode LCD manufactured using 3 or 4 masks to reduce the number of manufacturing processes have been developed. Unfortunately, in such an IPS mode LCD, a step difference of the stepped edge portion is increased, thereby making the alignment defect worse.

As shown in FIGS. 2A and 2B, an alignment layer 151 is formed on a pixel electrode 130 patterned on a lower substrate. The pixel electrode 130 has a stepped edge portion with a predetermined step difference. A color filter layer 160 and an alignment layer 152 are formed on an upper substrate facing the lower substrate. A liquid crystal layer 190 is formed between the upper and lower substrates. The stepped portion at the corners of the pixel electrode 130 in the pixel region may cause a non-uniform alignment of liquid crystal, thereby bringing about a problem in driving the liquid crystal. Specifically, if the liquid crystal is in a normally-black mode, a black color is displayed when no voltage is applied. Thus, light leakage occurs in a region A as shown in FIGS. 2A and 2B when no gate voltage is applied. That is, when no voltage is applied, the liquid crystal should be aligned in the same direction as the rubbing direction of the alignment layers 151 and 152. However, the stepped edge portion of the pixel electrode 130 causes a distortion phenomenon in which the liquid crystals have an alignment direction different than the rubbing direction. As a result, when no voltage is applied in the normally-black mode, light of the backlight assembly passes through the region A. This causes light leakage in a black display state and a decrease in a contrast ratio, thereby making it difficult to implement a high image quality.

SUMMARY OF THE INVENTION

Accordingly, the present invention is directed to a system for forming an alignment layer of a liquid crystal display (LCD) device and an operation method thereof that substantially obviate one or more problems due to limitations and disadvantages of the related art.

An object of the present invention is to provide a system for forming an alignment layer of an LCD device and an operation method thereof, in which an alignment layer with uniform characteristics is formed by performing an alignment process, while a substrate for the LCD having the alignment layer formed thereon passes through an in-line typed rubbing device, pre-treatment device and light irradiation device sequentially, thereby improving the efficiency of alignment process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the system for forming an alignment layer of a liquid crystal display device includes a rubbing apparatus to perform a rubbing process on the alignment layer on a substrate, a pre-treatment apparatus to thermally treat the substrate, and a light irradiation apparatus to irradiate light onto the substrate, wherein the rubbing apparatus, the pre-treatment apparatus and the light irradiation apparatus are constructed in an in-line type.

In another aspect of the present invention, the operation method of a system for forming an alignment layer of a liquid crystal display device includes transferring a substrate on which an alignment layer is placed into a rubbing apparatus, rubbing the alignment layer on the substrate, transferring the substrate into a pre-treatment apparatus and thermally treating the substrate, transferring the substrate into a light irradiation apparatus, and irradiating light onto the alignment layer on the substrate.

According to the present invention, in performing the alignment process on the alignment layer of the substrate in the LCD device according to the present invention, the rubbing apparatus, the pre-treatment apparatus, and the UV irradiation apparatus are constructed in an in-line type thereby easily and quickly accomplishing the alignment process and improving production yields.

In addition, the alignment is accomplished uniformly around the stepped portion of the electrode part by irradiating UV light after performing the pre-treatment such as the thermal treatment on the rubbed alignment layer of the substrate in the LCD device, thereby enhancing an image quality.

Furthermore, the alignment layer is thermally treated to weaken the side chain bond so as to easily decompose the side chain bond by the UV irradiation, thereby reducing UV irradiation energy and power consumption of a light source and reducing manufacturing costs and further improving production yields.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Figure 1:
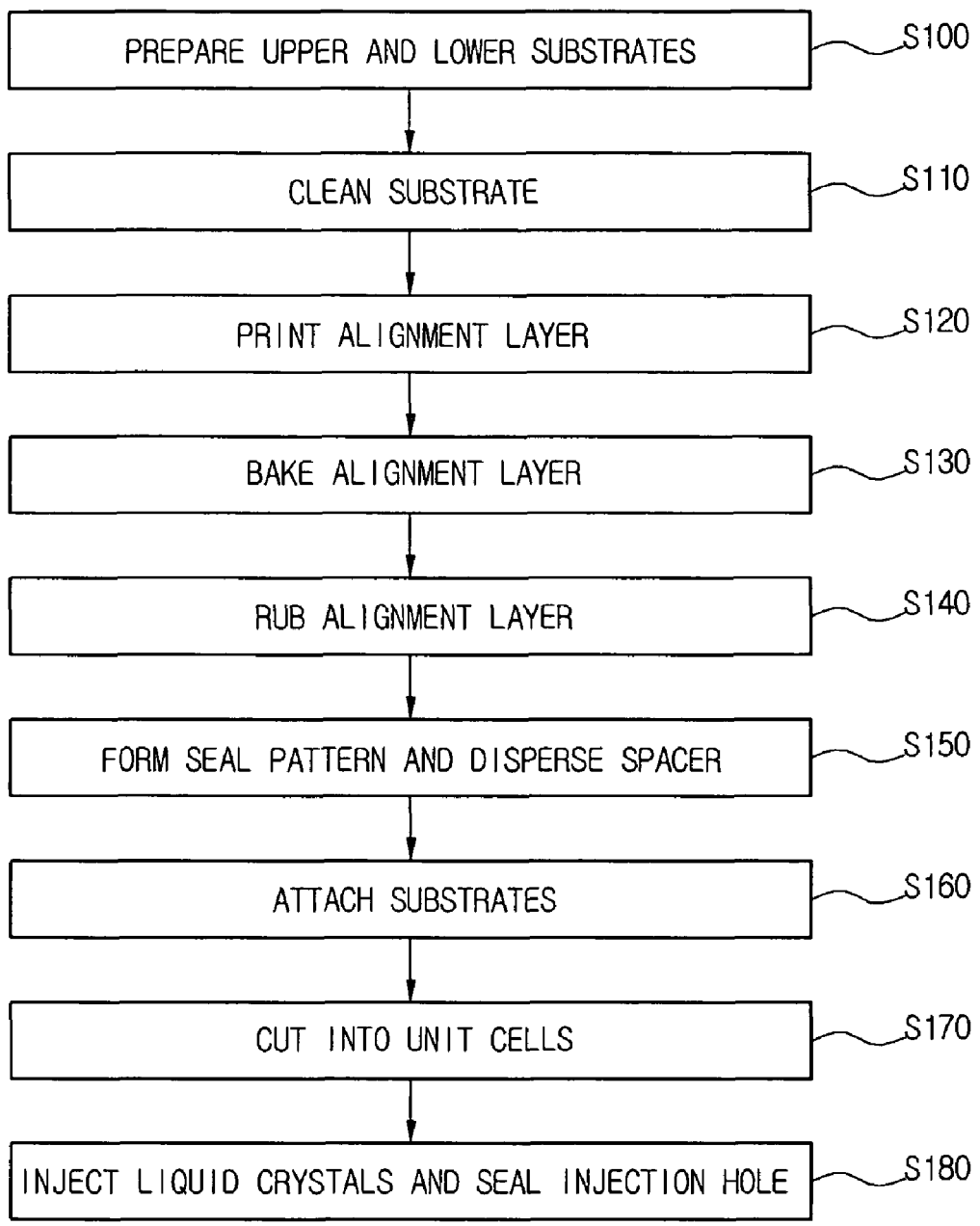
FIG. 1 is a flowchart schematically illustrating a method of fabricating a related art LCD.
Figure 2A:
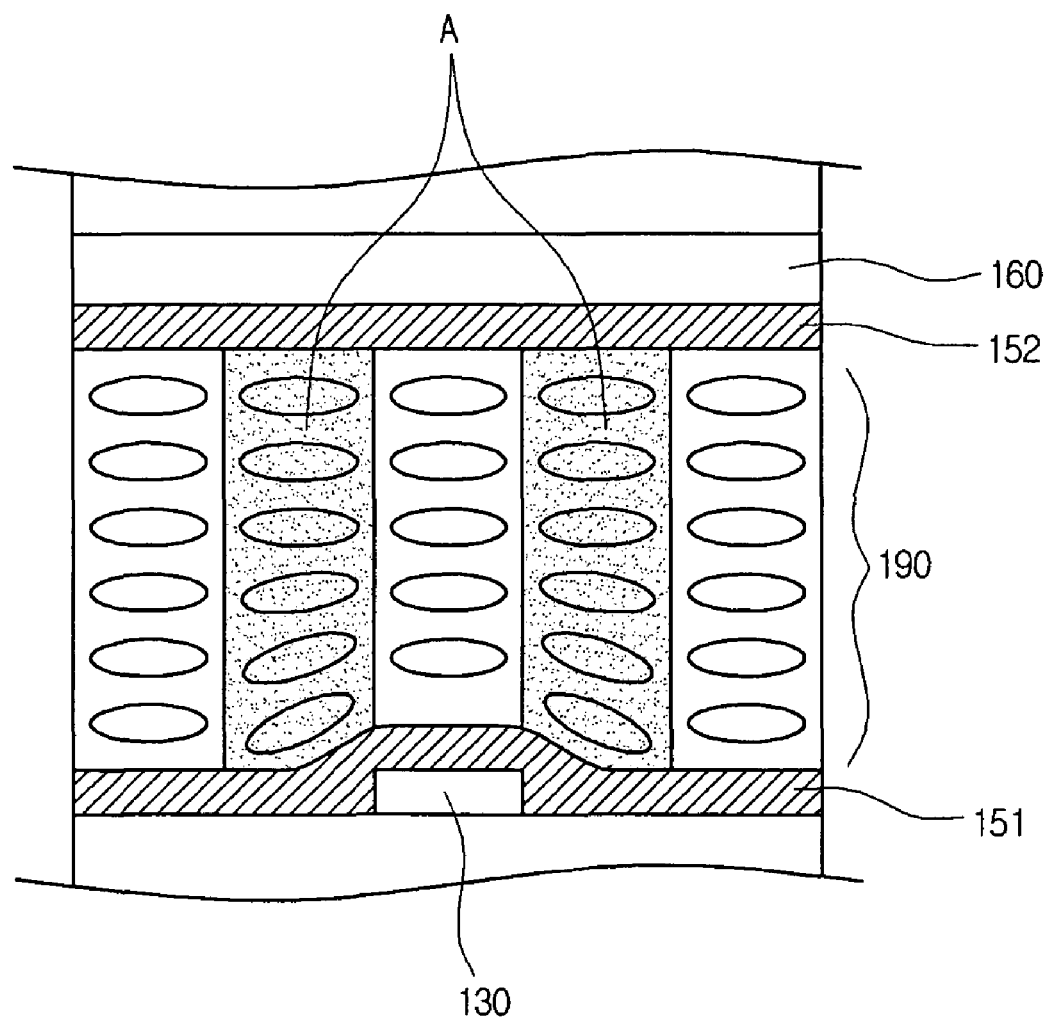
FIGS. 2A and 2B are a sectional view and a plan view schematically illustrating a liquid crystal alignment in a stepped portion according to a related art in-plane switching (IPS) mode LCD.
Figure 2B:
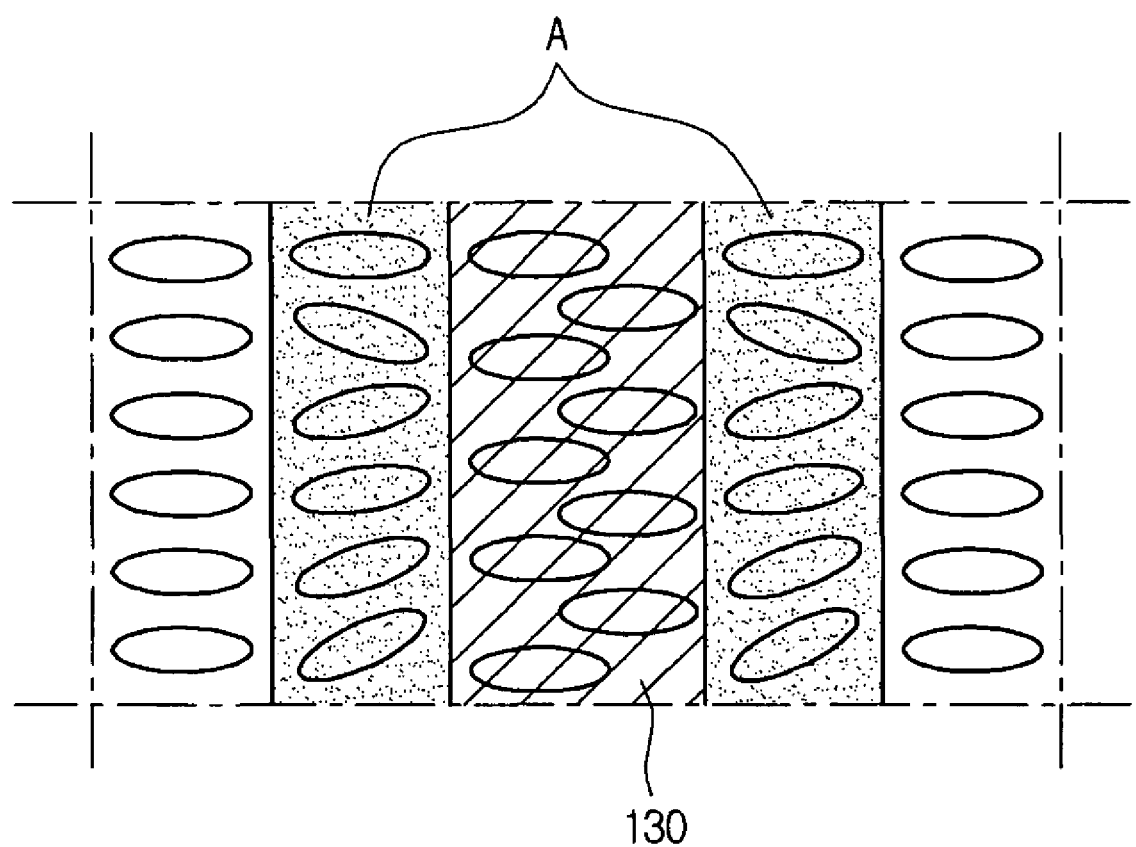

Reference will now be made in detail to the preferred embodiments of the present invention, examples of which are illustrated in the accompanying drawings. Wherever possible, the same reference numerals will be used throughout the drawings to refer to the same or like parts.

Figure 3:
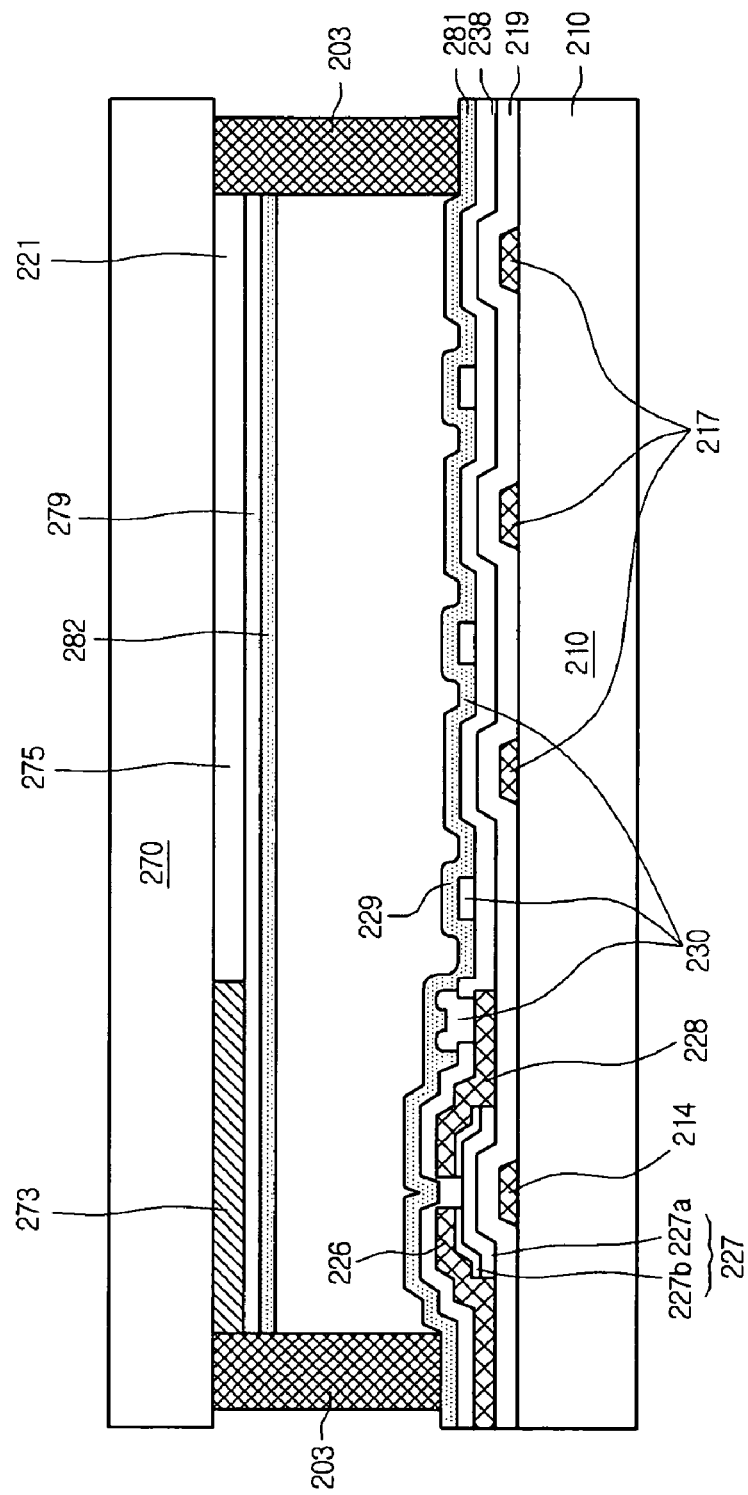
FIG. 3 is a sectional view schematically illustrating an exemplary IPS mode LCD device according to the present invention.

FIG. 3 is a sectional view schematically illustrating an exemplary in-plane switching (IPS) mode LCD device according to the present invention. As shown in FIG. 3, the exemplary in-plane switching (IPS) mode LCD device includes a thin film transistor (TFT) array substrate 210 that includes a low-resistance metal with a low resistivity deposited thereon to prevent signal retardation. The low-resistance metal layer is patterned by photolithography to form a gate line and a gate electrode 214 of the TFT. The gate electrode is extended from the gate line. The low-resistance metal may be any one of copper (Cu), aluminum (Al), aluminum alloy (AlNd), molybdenum (Mo), chrome (Cr), titanium (Ti), tantalum (Ta), molybdenum tungsten (MoW), and the like. During a process of forming the gate line and the gate electrode 214, a common line in a parallel direction with the gate line and a plurality of common electrodes 217 extended from the common line may be simultaneously formed. A gate insulating layer 219 is formed by depositing inorganic insulating material (e.g., silicon nitride (SiNx) or silicon oxide (SiOx)) on the entire surface of the resultant structure including the gate line by a plasma enhanced chemical vapor deposition (PECVD) process or the like.

The gate insulating layer 219 is provided with a material such as amorphous silicon, which is deposited thereon and is selectively removed to form a semiconductor layer 227 on the gate insulating layer 219 in the shape of an island. The semiconductor layer 227 includes an amorphous silicon layer 227a and an ohmic contact layer 227b onto which impurity ions are implanted. Moreover, a metal such as Cr, Al, Cu, Mo, Ti, Ta, MoW, and Al alloy, may be deposited on the entire surface above the gate insulating layer 219 and is patterned to form a data line. The data line crosses over the gate line in a vertical direction to thereby define a pixel region. A source electrode 226 and a drain electrode 228 are formed at both ends of the semiconductor layer 227. A passivation layer 238 may be formed by coating a silicon nitride layer or an organic insulating layer, such as benzo-cyclo-butene (BCB), on the entire surface of the array substrate 210 where the data line is formed. A contact hole (not shown) may be formed in the drain electrode 228. A transparent conductive layer may be deposited on the entire surface using a transparent conductive material such as indium tin oxide (ITO), indium zinc oxide (IZO) or the like and is patterned to form a plurality of pixel electrodes 230. The plurality of pixel electrodes 230 are connected to the drain electrode 228 and are disposed between common electrodes 217 in a parallel direction with the data line. The pixel electrodes 230 and the common electrodes 217 are alternately arranged. Although not shown, in the event that the pixel electrodes 230 are formed of a metallic material, the pixel electrodes 230 may be formed of the same material as the data line at the same time when the data line is formed, before forming the passivation layer 238.

According to an exemplary system for forming an alignment layer, the alignment layer may be formed on the array substrate 210 including the pixel electrode 230. The exemplary system for forming the alignment layer according to the present invention includes an apparatus for printing an alignment layer, an apparatus for performing a primary alignment process, an apparatus for performing a pre-treatment, and an apparatus for performing a secondary alignment process, which apparatuses are arranged in an in-line type. Such an arrangement can perform the processes effectively, thereby enhancing the characteristics of the alignment layer. Herein, the pre-treatment may be simultaneously performed with the primary or secondary alignment process, or may be performed in a pre-treatment chamber separately. The pre-treatment may be performed such that the alignment layer on the substrate is heated using an infrared (IR) irradiation device, or the alignment layer is heated after the substrate is loaded on an apparatus such as a hot plate, or heated in the chamber in which hot air, coil or hot pipe is provided. Such a pre-treatment weakens a side chain or a main chain bond of the alignment-processed polyimide in the material for the alignment layer 281 that has received the primary alignment process. The purpose of the primary alignment process is to maximize photodecomposition effect of the bond by UV irradiation. In the exemplary system for forming the alignment layer according to the present invention, the material for the alignment layer may be formed on the entire surface of the array substrate 210.

Referring to FIG. 3, a first alignment layer 281 is formed by printing and drying a polyimide resin on the array substrate 210. The polyimide resin has a good thermal resistance and excellent affinity with liquid crystal. Then, the primary alignment process is performed using a rubbing process. In addition to polyimide resin, the first alignment layer 281 may be formed of at least one alignment material selected from the group consisting of polyamic acid, polyethleneimine, polyvinyl alcohol, polyamide, polyethylene, polystylene, polyphenylenephthalamide, polyester, polyurethane, and polymethylmethacrylate, which include polymer of which bond is selectively broken in UV irradiation. In this case, the first alignment layer 281 may be formed in a vertical direction to a polarization direction.

When the first alignment layer 281 is formed of polystylene, the first alignment layer 281 is aligned to coincide with the polarization direction. In the primary alignment process, the first alignment layer 281 formed of polyimide is rubbed in one direction using a rubbing cloth such as velvet, rayon, nylon or the like, thereby forming the alignment direction. The pre-treatment process is performed on the array substrate 210 that has received the primary alignment process. The pre-treatment process is a pre-process of preparing for the secondary alignment process that is performed later. Specifically, the pre-treatment weakens a bonding force between molecules by heating the surface of the first alignment layer 281 to improve the efficiency in performing the secondary alignment process.

Assuming that the array substrate 210 is at a constant temperature Tc, it is heated up to a temperature satisfying a relational expression of Tr (a rubbing temperature)<Tc<Tg (a glass transition temperature of the alignment layer). Such a thermal treatment can improve the photoreactivity of the alignment layer 281 with the UV light in a process of irradiating light, and the alignment process can be effectively performed at a low effective energy. The thermal treatment may be performed before the process of irradiating light, or may be performed together with the process of irradiating light. The light is irradiated onto the pre-treated first alignment layer 281 so that the secondary alignment process is performed. The light may be a linearly polarized light or a partially polarized light. An oblique irradiation method or a vertical irradiation method may be used for the light irradiation. One of the light irradiation apparatuses irradiates light onto an entire surface of the substrate 210, and another irradiates light while scanning the substrate 210. Like this, if the secondary alignment process is performed after the thermal treatment is performed on the first alignment layer 281 that has received the primary alignment process, the alignment efficiency is maximized and thus the alignment is uniformly formed even at a stepped portion adjacent to the electrode part. In addition, the alignment layer 281 is thermally treated to weaken the chain bonding in the alignment layer 281 so that the material for the alignment layer 281 is easily decomposed by light irradiation, thereby reducing UV irradiation energy and power consumption of a light source, and further reducing manufacturing costs and improving production yields.

A black matrix 273 is formed using a black resin or a metal (e.g., Cr or CrOx) to prevent light leakage in the gate line, the data line, and the TFT region, where liquid crystals on a color filter substrate 270 cannot be controlled. There are R, G and B color filters 275 for color reproduction formed between openings of the black matrix 273 by using an electrodeposition method, a pigment dispersion method, or a coating method. In order to protect the color filter layers 275, an overcoat layer 279 may be formed on the entire surface of the structure including the color filter layers 275. A second alignment layer 282 may be formed on the overcoat layer 279 by printing polyimide material having good affinity with liquid crystals and good photo-sensitive properties. The second alignment layer 282 receives the same alignment process as the primary alignment process of the first alignment layer 281. A column spacer (not shown) may be formed on either the array substrate 210 or the color filter substrate 270. A seal pattern 203 may be formed at edges of the array substrate 210 or the color filter substrate 270. The array substrate 210 and the color filter substrate 270 are bonded together in a vacuum state to thereby form a liquid crystal panel.

Figure 4:
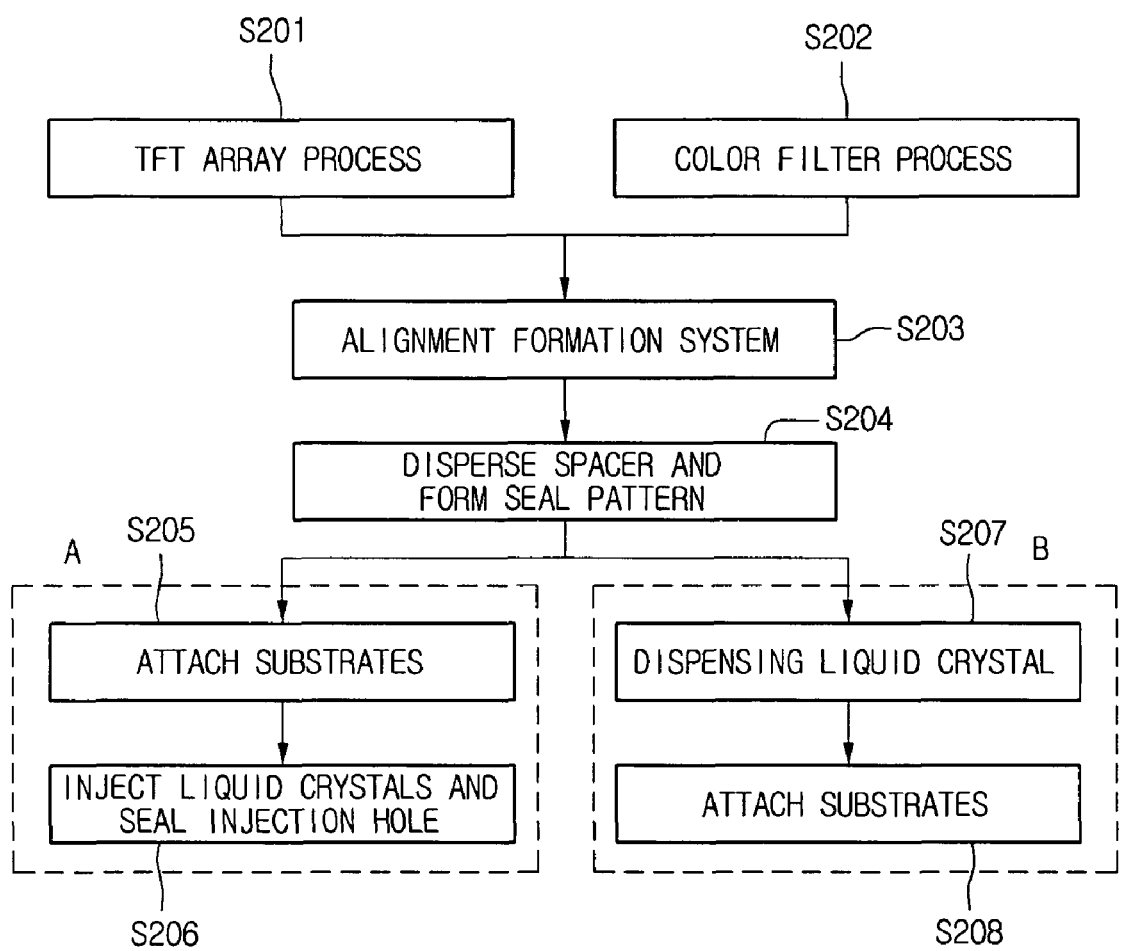
FIG. 4 is a flowchart schematically illustrating an exemplary method of fabricating the LCD device according to the present invention.

FIG. 4 is a flowchart schematically illustrating an exemplary method of fabricating the LCD device according to the present invention. As illustrated in FIG. 4, at Steps S201 and S202, a driving element TFT and a color filter layer are formed on a lower substrate (array substrate) and an upper substrate (color filter substrate) through array process and color filter process, respectively. Herein, the lower substrate may include a plurality of gate lines, a plurality of data lines, a plurality of pixel electrodes, and a plurality of TFTs. The plurality of gate lines may be arranged in one direction and have a predetermined intra-distance therebetween. The plurality of data lines are perpendicular to the plurality of gate lines and have another predetermined intra-distance therebetween. The plurality of pixel electrodes may be formed in a matrix configuration at respective pixel regions where the plurality of gate lines are intersected with the plurality of data lines. The plurality of TFTs are switched in response to signals of the gate lines to transfer signals of the data lines to the plurality of pixel electrodes. The upper substrate may include a black matrix to block the light at a portion except the pixel region, R, G and B color filters for reproducing colors, and a common electrode for reproducing an image.

The LCD device fabricated according to the exemplary method of the present invention may be a vertical electric field mode LCD, such as a twisted nematic (TN) mode LCD and a vertical alignment (VA) mode LCD, in which the common electrode is formed on the upper substrate. Alternatively, the present invention may be applied to various kinds of modes such as an in-plane switching (IPS) mode, a fringe field switching (FFS) mode or the like, in which the common electrode is formed on the lower substrate. The process of fabricating the upper substrate is referred to as color filter process but the process for the color filter layer or the black matrix layer may be performed together with the array process of the lower substrate depending on the type of the LCD device and a process thereof. The array process and the color filter process may be batch-processed on a large-sized glass substrate where a plurality of panel regions are formed. Specifically, the plurality of gate lines and data lines are formed on the lower substrate to define the pixel regions by the array process. The TFTs connected to the gate lines and the data lines are formed on the respective pixel regions. The pixel electrode is formed by the array process to be in contact with the TFT, thereby driving the liquid crystals in response to a signal transferred through the TFT. The R, G and B color filters are formed on the upper substrate for reproducing various colors by the color filter process.

At Step S203, the lower substrate having the TFTs and the upper substrate having the color filter layer receive the primary alignment process, the pre-treatment, and the secondary alignment process according to the exemplary system for forming the alignment layer. The alignment layer is thus formed. In particular, the exemplary system for forming the alignment layer according to the present invention is more effective for the IPS mode LCD device in which the common electrode and the pixel electrode are formed together on one substrate. In other words, since the common and pixel electrodes or the gate and data lines are formed in a stripe pattern or zigzag pattern having stepped portions in the IPS mode LCD device, the alignment process may not be performed well at the stepped portion by the rubbing process. The present invention, however, can overcome the above disadvantage through the primary alignment process, the pre-treatment, and the secondary alignment process, as described herein. Moreover, the exemplary system for forming the alignment layer according to the present invention performs the processes in an in-line type, namely, in sequence, when the substrate is loaded into the system, thereby improving the efficiency of the alignment process and increasing the product yields.

At Step S205, the upper and lower substrates are attached together. At Step S206, after the upper and lower substrates are attached together, liquid crystal is injected through an injection hole into a gap between the upper and lower substrates, and the injection hole is then sealed to complete a liquid crystal panel. Moreover, instead of the liquid crystal injection method as illustrated in block A of FIG. 4, the liquid crystal panel may be fabricated by a liquid crystal dispensing method as illustrated in block B of FIG. 4. At Step S207, the liquid crystal is dispensed onto the liquid crystal panel of the lower substrate. Thereafter, at Step S208, the upper and lower substrates are attached together. By the above-described processes, a plurality of liquid crystal panels having liquid crystal layers are formed on a large-sized glass substrate (lower and upper substrates). Then, the glass substrate is cut into the plurality of liquid crystal panels. After each of the liquid crystal panels is inspected, the LCD device is thus completed.

Figure 5:
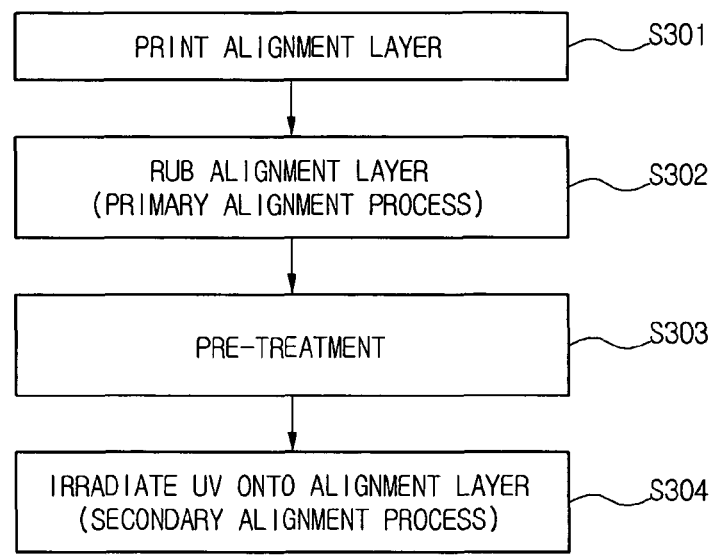
FIG. 5 is a flowchart schematically illustrating a process of forming an alignment layer in accordance with an exemplary system for forming the alignment layer according to an exemplary embodiment of the present invention.
Figure 6:
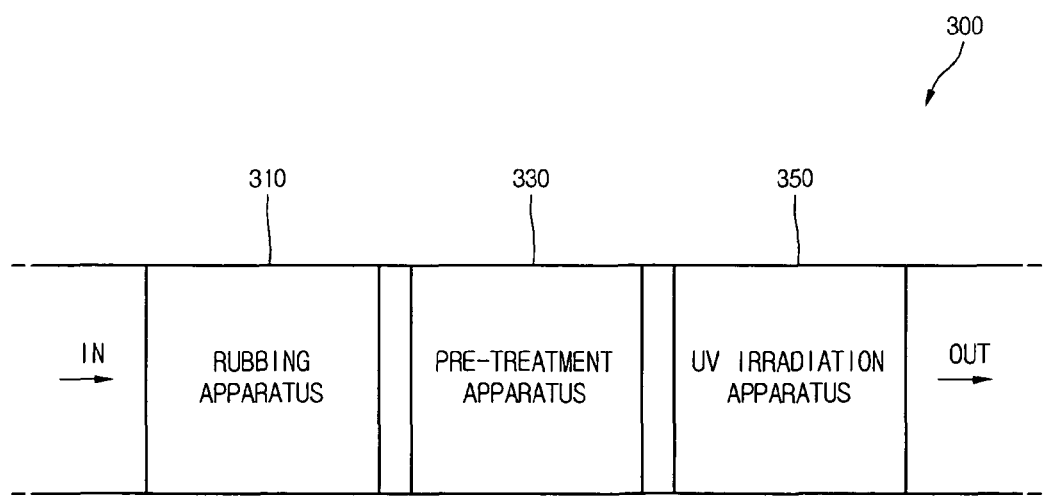
FIG. 6 is a schematic view illustrating how to perform the process of forming the alignment layer according to a first exemplary embodiment of the present invention.
Figure 7A:
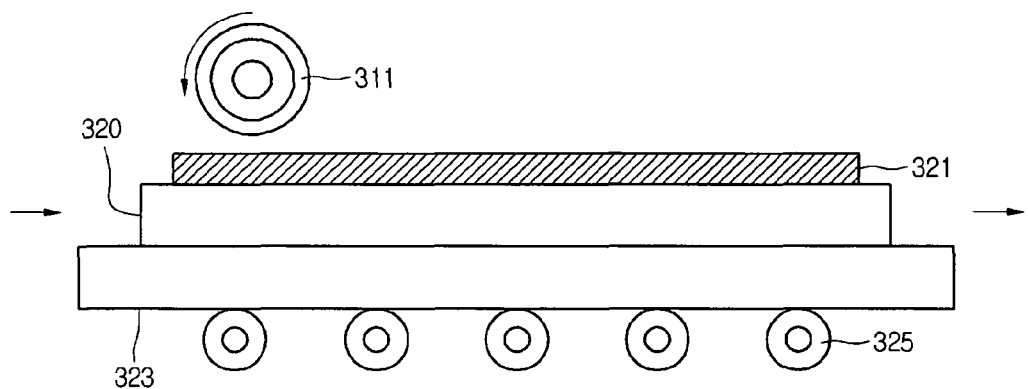
FIGS. 7A to 7C are sectional views illustrating the process of forming the alignment layer as illustrated in FIGS. 5 and 6.
Figure 7B:
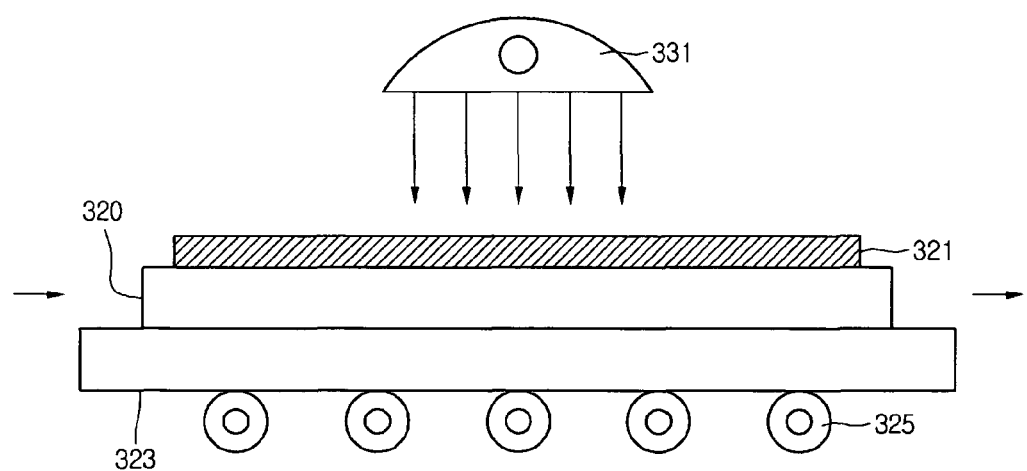
Figure 7C:
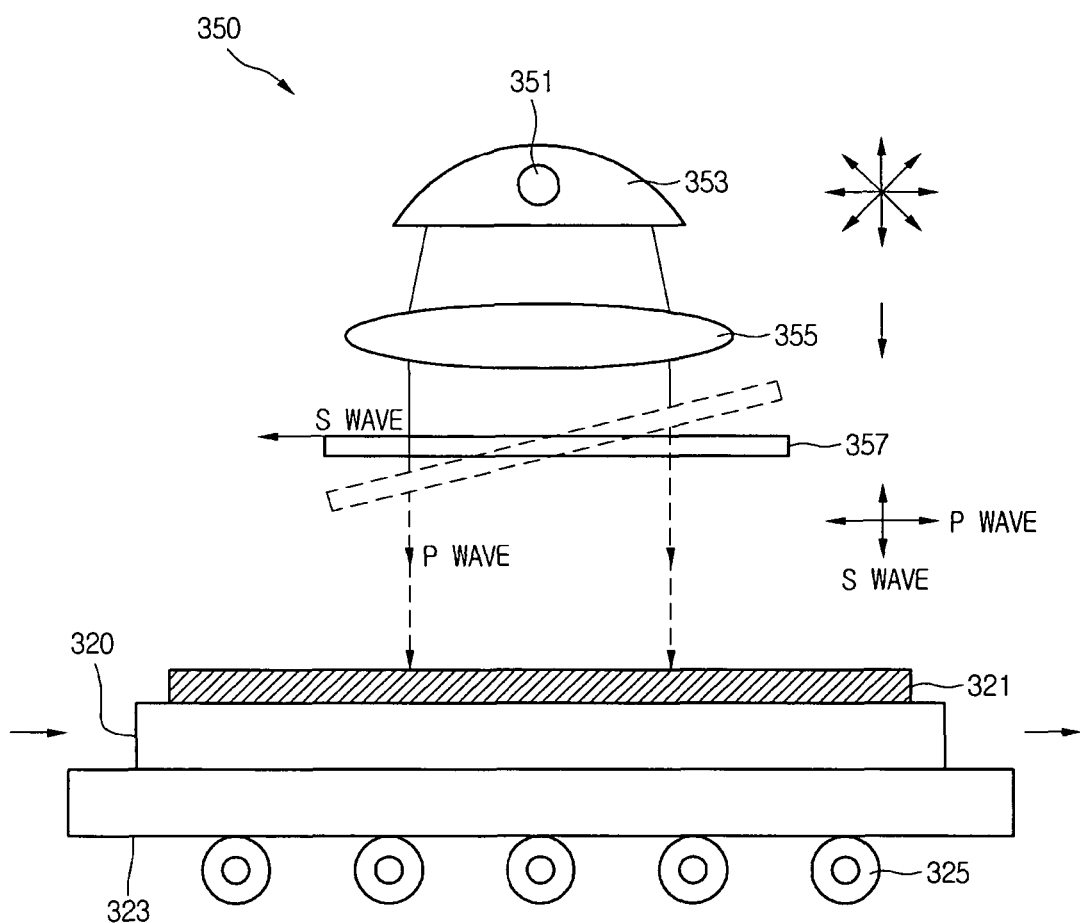

FIG. 5 is a flowchart schematically illustrating an exemplary process of forming an alignment layer in accordance with an exemplary system for forming the alignment layer according to the present invention. FIG. 6 is a schematic view illustrating how to perform the process of forming the alignment layer according to a first exemplary embodiment of the present invention. FIGS. 7A to 7C are sectional views schematically illustrating the process of forming the alignment layer as illustrated in FIGS. 5 and 6.

Referring to FIGS. 5 and 7A, at Step 301, an alignment layer 321 (of FIG. 7A) is printed on a TFT array substrate (or lower substrate) and a color filter substrate (or upper substrate). Hereinafter, the TFT array substrate (or lower substrate) and the color filter substrate (or upper substrate) are commonly referred to as the substrate 320 (of FIG. 7A). The alignment layer 321 may be printed using spinning, dipping, roller coating, slit coating and inkject printing. In addition to polyimide resin, the alignment layer 321 may be formed of at least one alignment material selected from the group consisting of polyamic acid, polyethleneimine, polyvinyl alcohol, polyamide, polyethylene, polystylene, poly-phenylenephthalamide, polyester, polyurethane, and poly-methylmethacrylate, which include polymer of which bond is selectively broken in UV irradiation. In this case, the alignment layer 321 may be aligned in a vertical direction to a polarization direction. In the event that the alignment layer 321 is formed of polystylene, the alignment layer 321 is aligned to coincide with the polarization direction.

Referring to FIGS. 5, 6 and 7A, the substrate 320 on which the alignment layer 321 is formed is loaded into the exemplary system for completing the alignment layer 321. Then, at Step S302, the alignment layer 321 is rubbed at a rubbing apparatus 310 through a primary alignment process, namely, a rubbing process. During the rubbing process, a solvent contained in the alignment layer 321 on the substrate 320 is volatilized at about 60~80° C., the deposited material on the alignment layer 321 is hardened at about 80~200° C. After that, the alignment layer 321 is rubbed in one direction with a roller having a rubbing cloth such as velvet wound therearound, thereby forming an alignment direction thereof.

Here, the alignment layer 321 may include a side chain alignment typed alignment layer (hereinafter, referred to as side chain alignment layer) and a main chain alignment typed alignment layer (hereinafter, referred to as main chain alignment layer). In the side chain alignment layer, side chain bonds are broken or arranged by the rubbing cloth or UV irradiation, thereby determining a pretilt angle of the liquid crystal in one direction. In the main chain alignment layer, main chain bonds formed isotropically are broken in one direction by the rubbing cloth or UV irradiation so that liquid crystals are aligned along the arrangement direction of the remaining main chain, thereby determining the pretilt angle. The side chain alignment type will be illustrated in detail below.

The alignment layer 321 that has undergone the primary alignment process includes a stable bonding structure in which the side chains are not aligned well along the alignment direction. Therefore, referring to FIGS. 6 and 7B, the alignment layer 321 that has undergone the primary alignment process is transferred to a pre-treatment apparatus 330 from the rubbing apparatus 310 to receive the pre-treatment at Step S303. Since the rubbing apparatus 310 and the pre-treatment apparatus 330 are arranged in an in-line type, the alignment layer 321 that has undergone the primary alignment process can be easily and rapidly transferred to the pre-treatment apparatus 330 from the rubbing apparatus 310 by means of a stage 323 (of FIG. 7B), on which the substrate 320 is placed and rollers 325 are provided. The pretreatment is a pre-process prior to a secondary alignment process that is performed later. This pre-treatment can improve the efficiency of the secondary alignment process by forming a surface of the alignment layer 321 in a stable structure in which the alignment is disarrayed after the primary alignment process. The pre-treatment may be simultaneously performed with the primary or secondary alignment process, or may be performed in a separate chamber for the pre-treatment. The pre-treatment is performed such that the alignment layer 321 on the substrate 320 is heated using an infrared (IR) irradiation apparatus.

The IR irradiation apparatus 331 (of FIG. 7B) heats the air between the IR irradiation apparatus 331 and the alignment layer 321, thereby thermally conducting the heated air to heat up the alignment layer 321. Alternatively, the alignment layer 321 may be directly heated up with infrared ray. The pre-treatment is performed such that the alignment layer 321 is heated after the substrate 320 is loaded on an apparatus such as a hot plate, or heated in the chamber in which hot air, coil or hot pipe is provided. Such a pre-treatment weakens the side chain bonds in the material for the alignment layer 321 that has undergone the primary alignment process. Accordingly, photodecomposition effect of the bond by UV irradiation can be maximized in the secondary alignment process.

Assuming that the substrate 320 is at a constant temperature Tc, it is heated up to a temperature satisfying a relational expression of Tr (a rubbing temperature)<Tc<Tg (a glass transition temperature of the alignment layer). Such a thermal treatment can improve the photoreactivity of the alignment layer 321 with the UV in the secondary alignment process, and the alignment process can be effectively performed at a low effective energy. The thermal treatment may be performed before the secondary alignment process, or may be performed together with the secondary alignment process.

At Step S304, as shown in FIGS. 6 and 7C, the alignment layer 321 that has undergone the primary alignment process and the pre-treatment is transferred to a UV irradiation apparatus 350, wherein the secondary alignment process is performed. Since the rubbing apparatus 310, the pre-treatment apparatus 330 and the UV irradiation apparatus 350 are constructed in an in-line type, the alignment layer 321 that has undergone the primary alignment process and the pre-treatment can be easily and rapidly transferred to the UV irradiation apparatus 350 from the pre-treatment apparatus 330 by means of a stage 323 on which the substrate 320 is placed and the rollers 325 are provided. Here, the alignment layer 321 is thermally treated to weaken the side chain bonding force in the alignment layer 321 so that the side chain bonds of the non-rubbed alignment layer can be easily decomposed by UV irradiation, thereby reducing UV irradiation energy and power consumption of a light source and further reducing manufacturing costs and improving production yields. The secondary alignment process may be performed on the alignment layer 321 that has undergone the pre-treatment, using a linearly polarized light or a partially polarized light. An oblique irradiation method or a vertical irradiation method may be used for the light irradiation. One of the light irradiation apparatuses 350 (of FIG. 7C) irradiates light onto an entire surface of the substrate 320, and another irradiates light while scanning the substrate 320. The UV irradiation apparatus 350 may include a light source 351, an optical lens 355 and a polarizing element 357. Here, the entire surface of the substrate 320 may be scanned using a line type lamp 351 as the light source while the substrate 320 is moving. Alternatively, the entire surface of the substrate 320 may be simultaneously scanned using a plurality of the line type light sources. Moreover, a quartz substrate configured as single layer or multi-layers may be used as the polarizing element 357, or a sheet-shaped polarizer may be used as the polarizing element 357. The polarizing element 357 may be disposed in a parallel direction with the substrate 320, or disposed obliquely with respect to the substrate 320. The optical lens 355 makes non-polarized light irradiated from the light source 351 incident onto the polarizing element 357 after condensing, diffusing or paralleling the non-polarized light. The UV irradiation apparatus 350 converts the non-polarized light into a partially-polarized light and then irradiates the partially-polarized light onto the alignment layer 321. At this time, the pre-treated alignment layer 321 has weak side chain bonds so that the light irradiation efficiency is maximized, thereby uniformly forming the alignment even at a stepped portion adjacent to the electrode part. The light may be a linearly polarized light or a partially polarized light.

Figure 8A:
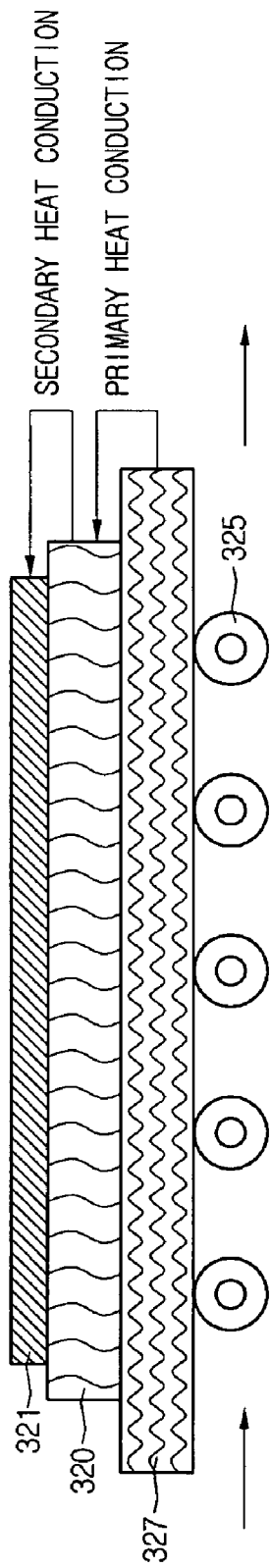
FIG. 8A is a sectional view illustrating a pre-treatment device of a system for forming an alignment layer according to a second exemplary embodiment of the present invention.

FIG. 8A is a sectional view schematically illustrating a pre-treatment device of a system for forming an alignment layer according to a second exemplary embodiment of the present invention. As shown in FIG. 8A, in the pre-treatment apparatus of the system for forming the alignment layer according to the second exemplary embodiment, the substrate 320 may be heated while it is placed on a hot plate 327. A primary heat conduction is made from the hot plate 327 to the substrate 320, and then a secondary heat conduction is made from the heated substrate 320 to the alignment layer 321, thereby heating the alignment layer 321. The substrate 320 mounted on the hot plate 327 may be heated by the hot plate 327 while the substrate 320 is at a standstill for a predetermined time, after it is transferred by the stage 323 (of FIG. 7B) and the rollers 325. Alternatively, the substrate 320 may be heated while it is passing through a hot plate zone.

Figure 8B:
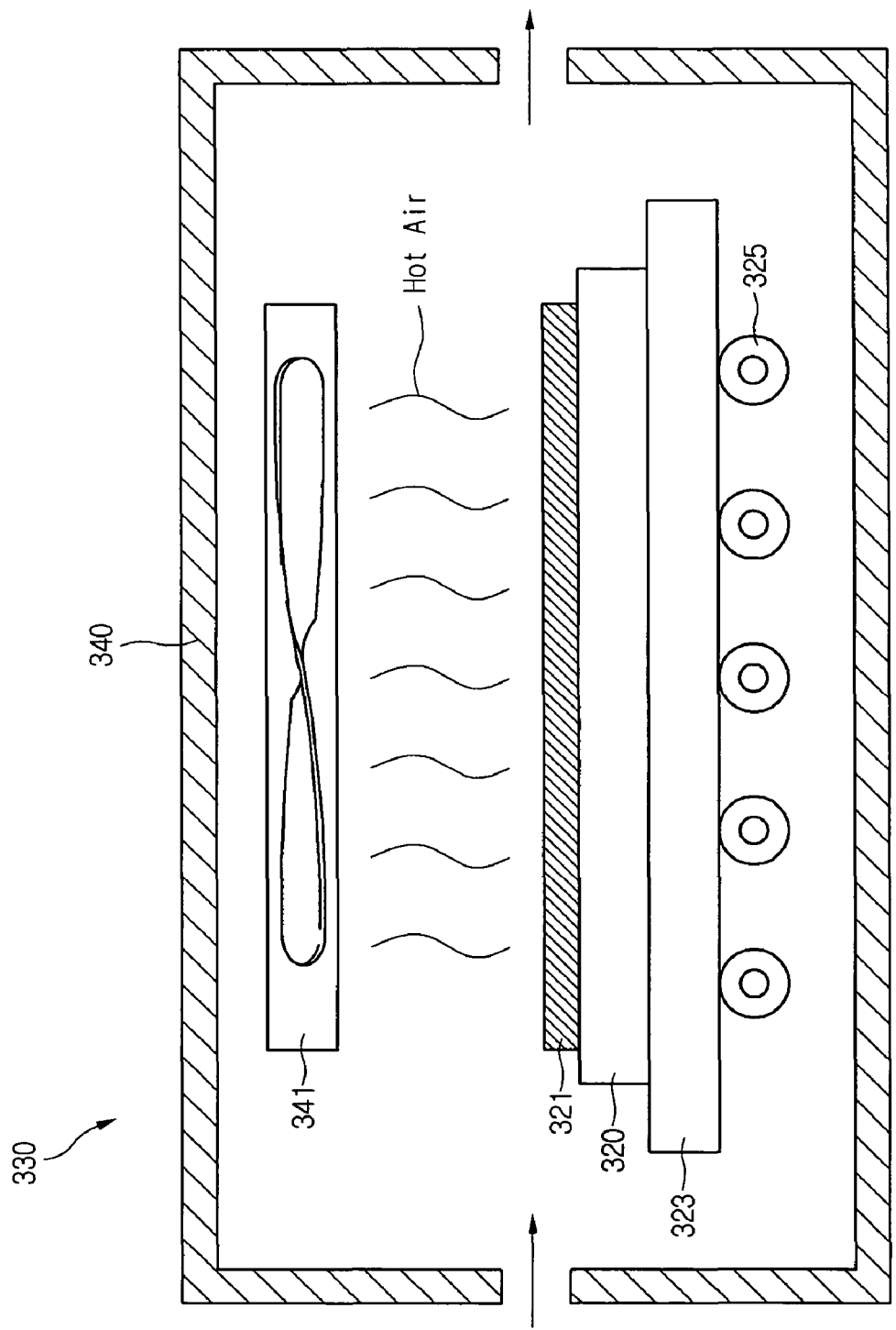
FIG. 8B is a sectional view illustrating a pre-treatment device of a system for forming an alignment layer according to a third exemplary embodiment of the present invention.

FIG. 8B is a sectional view schematically illustrating a pre-treatment device of a system for forming an alignment layer according to a third exemplary embodiment of the present invention. As shown in FIG. 8B, the pre-treatment may be performed in a pre-treatment chamber 340 of the system for forming the alignment layer according to the third exemplary embodiment. The pre-treatment chamber 340 may include a hot air fan 341 for heating the substrate 320, thereby heating the alignment layer 321 on the substrate 320.

Figure 8C:
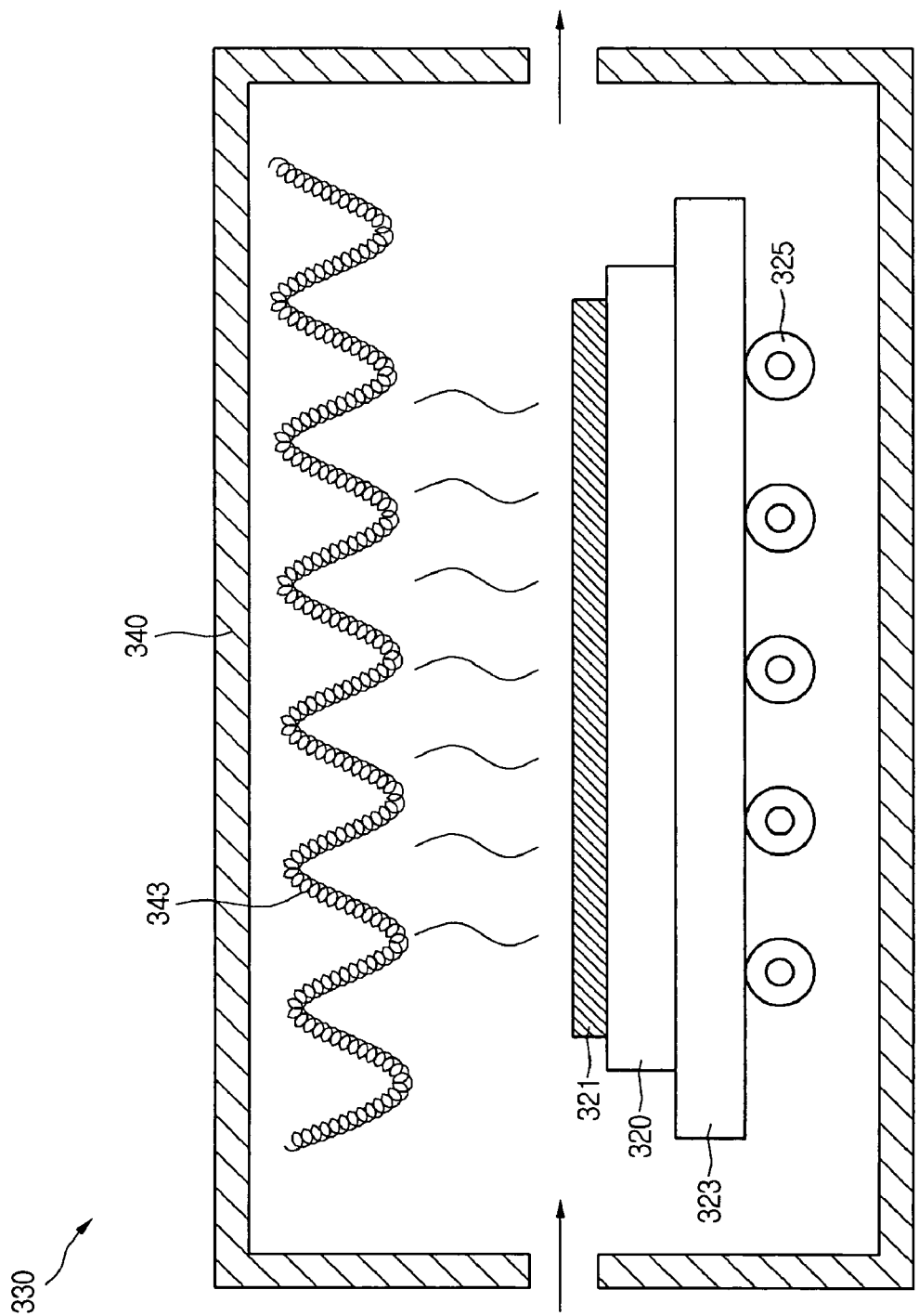
FIG. 8C is a sectional view illustrating a pre-treatment device of a system for forming an alignment layer according to a fourth exemplary embodiment of the present invention.

FIG. 8C is a sectional view schematically illustrating a pre-treatment device of a system for forming an alignment layer according to a fourth exemplary embodiment of the present invention. As shown in FIG. 8C, the pre-treatment may be performed in the pre-treatment chamber 340 according to the fourth exemplary embodiment. The pre-treatment chamber 340 may include a coil 343 or a hot pipe for heating the substrate 320, thereby heating the alignment layer 321 on the substrate 320.

Figure 8D:
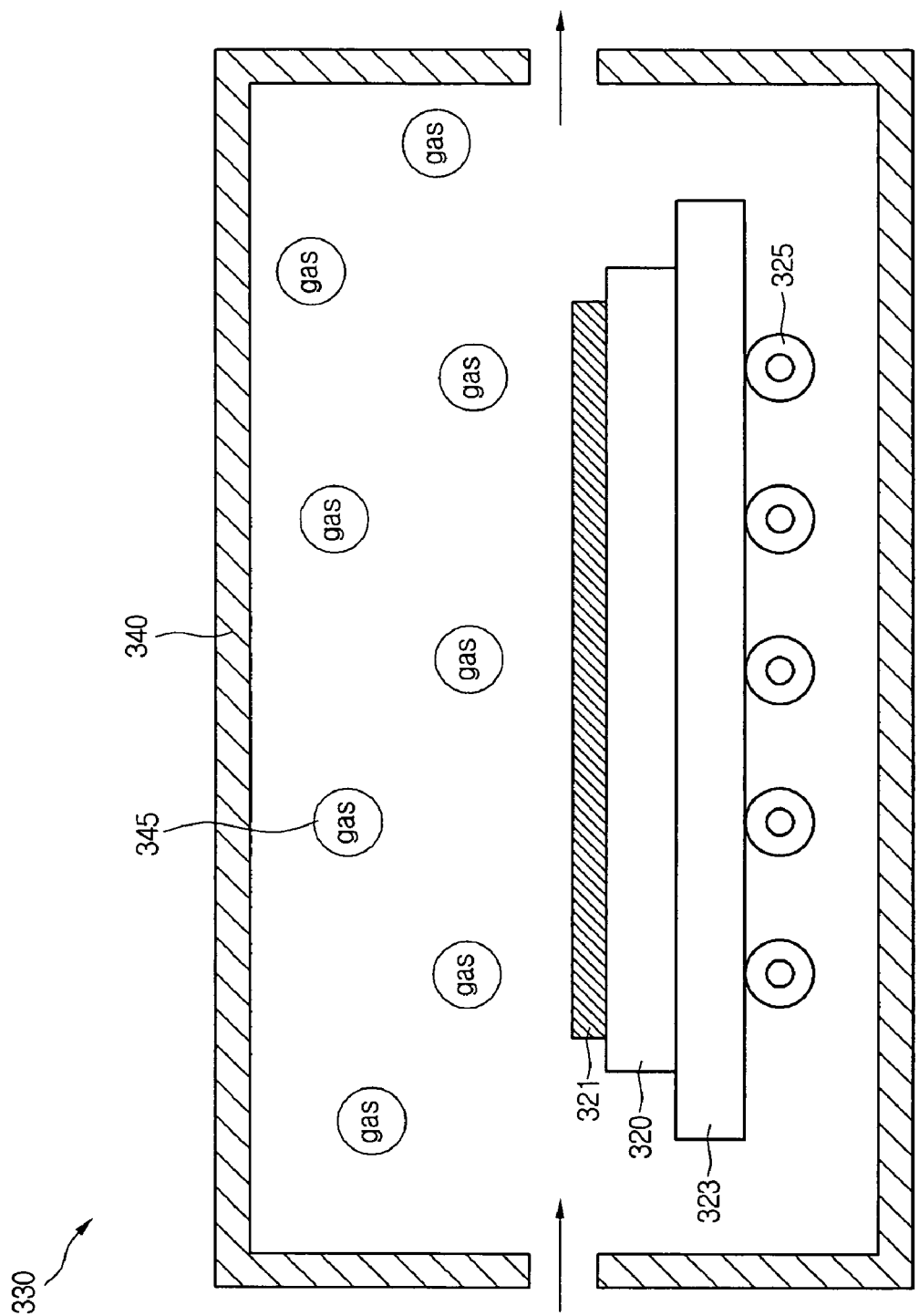
FIG. 8D is a sectional view illustrating a pre-treatment device of a system for forming an alignment layer according to a fifth exemplary embodiment of the present invention.

FIG. 8D is a sectional view schematically illustrating a pre-treatment device of a system for forming an alignment layer according to a fifth exemplary embodiment of the present invention. As shown in FIG. 8D, the pre-treatment apparatus 330 of the system for forming the alignment layer according to the fifth exemplary embodiment, supplies a gas 345 such as oxygen gas ($O_2$) or nitrogen gas ($N_2$) into the pre-treatment chamber 340 to enhance the photoreactivity, thereby increasing light irradiation efficiency. The gas 345 is supplied into the UV irradiation apparatus without using the additional pre-treatment chamber, thereby making gas ambient parallel with the UV irradiation. Moreover, a photo initiator (not shown) may be formed on the entire surface of the alignment layer 321 on the substrate 320 in the pre-treatment chamber 340. The photo initiator is used for further improving the photoreactivity between the alignment material and the UV light to maximize the light irradiation efficiency. The photo initiator may be coated with the alignment material mixed together.

The pre-treatment apparatus 330 according to the various exemplary embodiments may be installed in a parallel direction with the UV irradiation apparatus 350. In this case, the pre-treatment and the secondary alignment process may be simultaneously performed on the alignment layer 321. Moreover, the pre-treatment apparatus 330 may be installed in a parallel direction with the rubbing apparatus 310. In this case, the pre-treatment and the primary alignment process may be simultaneously performed on the alignment layer 321.

Figure 9A:
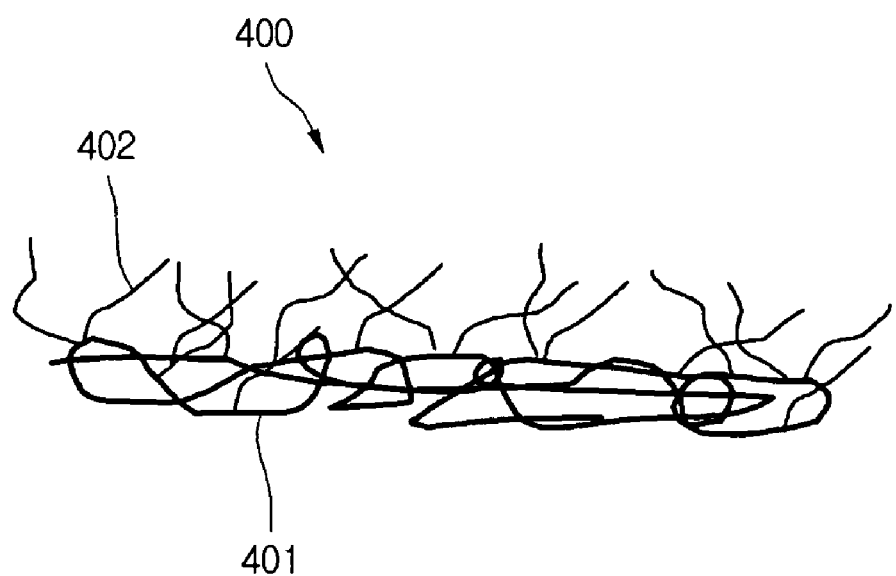
FIG. 9A is a schematic view illustrating a side structure of an alignment layer rubbed by the system of forming the alignment layer according to the present invention.
Figure 9B:
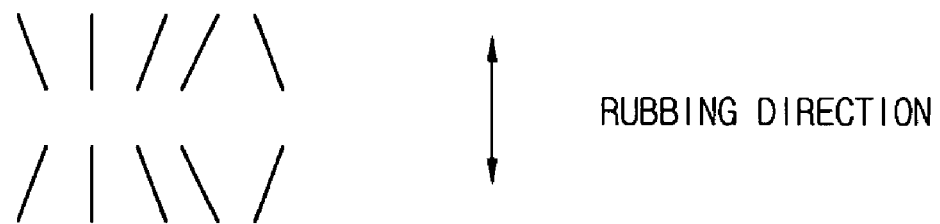
FIG. 9B is a plane view schematically illustrating a side chain distribution of the alignment layer rubbed by the system of forming the alignment layer according to the present invention.
Figure 10A:
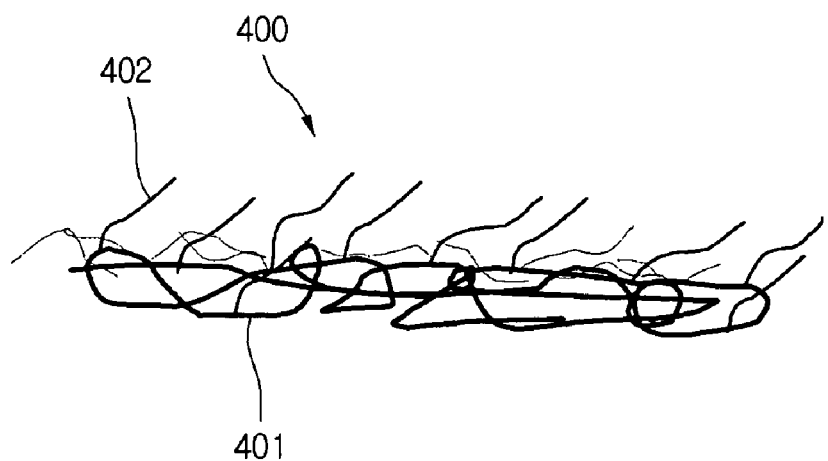
FIG. 10A is a schematic view illustrating a side structure of a ultraviolet (UV)-treated alignment layer of FIG. 9A.
Figure 10B:
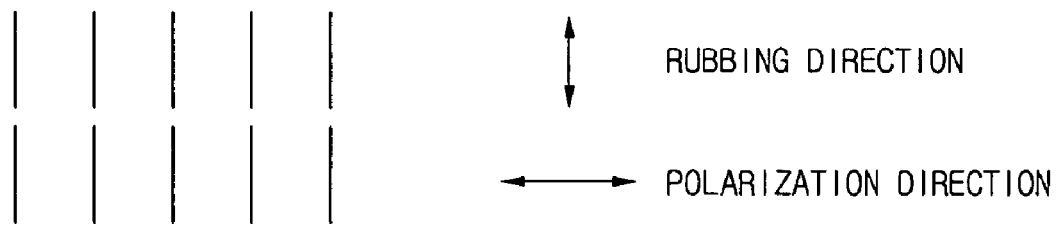
FIG. 10B is a plane view schematically illustrating a side chain distribution of the UV-treated alignment layer of FIG. 9B.
Figure 11A:
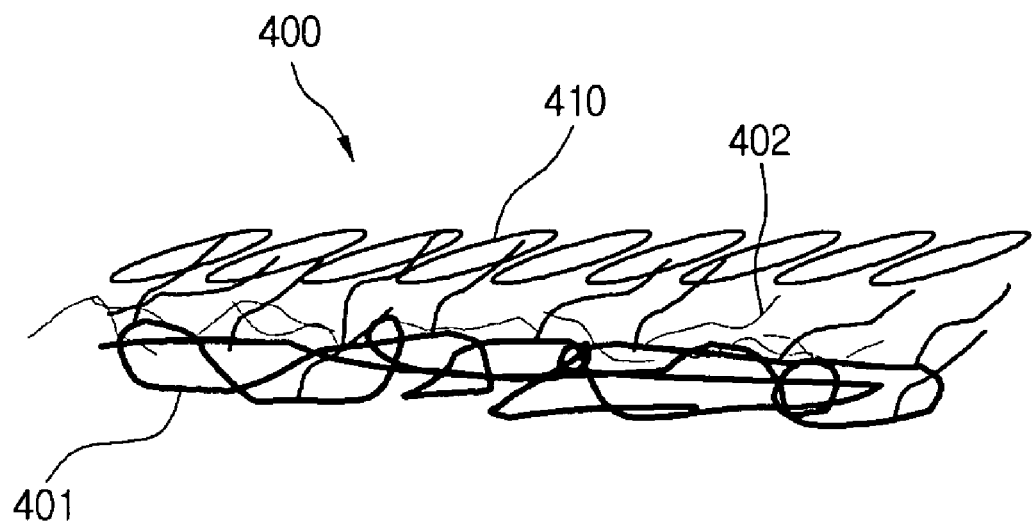
FIG. 11A is a schematic view illustrating an alignment of a liquid crystal on the alignment layer according to the present invention.
Figure 11B:
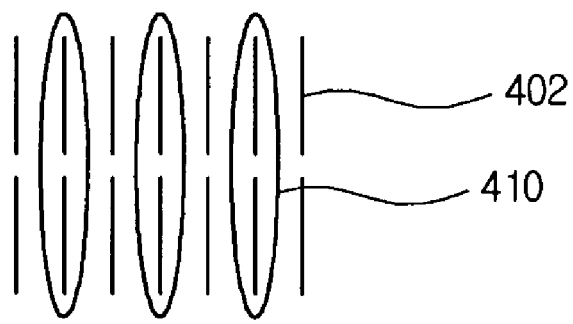
FIG. 11B is a plane view schematically illustrating an alignment of a liquid crystal on the alignment layer.

FIGS. 9A to 11B are views schematically illustrating the structures of the side chain alignment layer that has undergone the alignment process in accordance with the exemplary system for forming the alignment layer according to the present invention. FIG. 9A is a schematic view illustrating a side structure of an alignment layer rubbed by the exemplary system of forming the alignment layer according to the present invention, and FIG. 9B is a plane view schematically illustrating a side chain distribution of the alignment layer rubbed by the exemplary system of forming the alignment layer according to the present invention. FIG. 10A is a schematic view illustrating a side structure of the UV-treated alignment layer of FIG. 9A, and FIG. 10B is a plane view schematically illustrating a side chain distribution of the UV-treated alignment layer of FIG. 9A. FIG. 11A is a schematic view illustrating an alignment of a liquid crystal by the alignment layer according to the present invention, and FIG. 11B is a plane view schematically illustrating an alignment of a liquid crystal on the alignment layer.

As shown in FIGS. 9A and 9B, in a rubbed alignment layer 400, side chains 402 bonded to main chains 401 are arrayed in one direction. On the contrary, in the alignment layer that is not rubbed well, the side chain 402 is not arrayed uniformly in one direction. Further, as shown in FIGS. 10A and 10B, when the UV light is irradiated after weakening a bonding structure of the side chain 402 by performing the pre-treatment process such as the thermal treatment process on the alignment layer 400 that has undergone the rubbing process, the bond of the side chains 402 having a direction identical to the polarization direction is broken so that the side chains 402 determining the alignment of the liquid crystal are uniformly distributed. Here, the rubbing direction and the polarization direction are perpendicular or identical to each other. Moreover, as shown in FIGS. 11A and 11B, the liquid crystals are uniformly aligned in one direction along the alignment direction of the side chains 402 in the side chain alignment layer 400 according to the present invention, and have a predetermined pretilt angle.

Figure 12A:
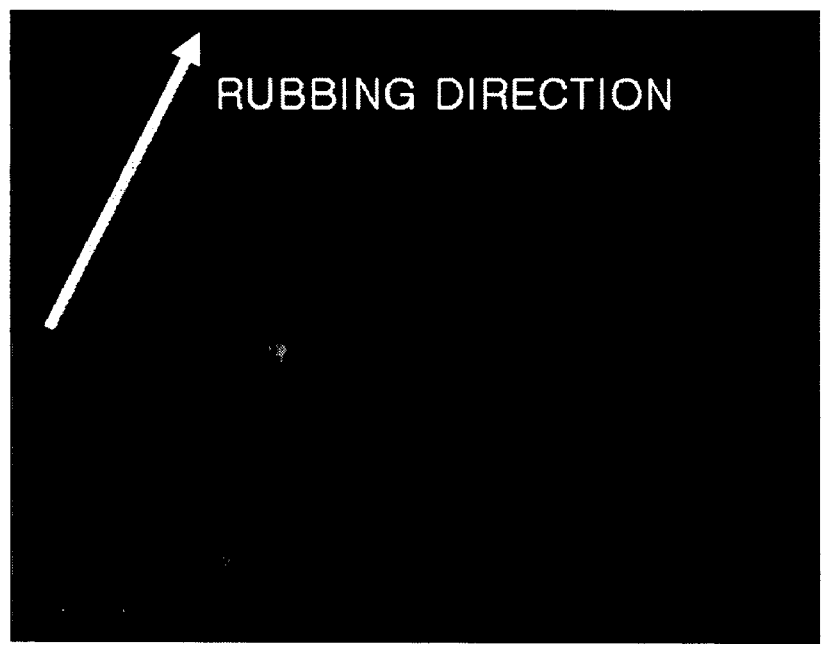
FIGS. 12A and 12B are photographs schematically illustrating light leakage in the IPS mode LCD device according to the present invention, compared to the related art.
Figure 12B:

FIGS. 12A and 12B are photographs illustrating light leakage in the IPS mode LCD device according to the present invention, compared to the related art. As shown in FIG. 12A, in the related art, when the substrate is only rubbed during the primary alignment process, the rubbing cloth is not in contact with a portion of the alignment layer, which portion is a stepped portion adjacent to the electrode part of which a step height is 0.1□ or greater. Accordingly, since the stepped portion is not aligned and the rubbing cloth is scattered while it passes through the stepped portion, the alignment is not uniform, thereby causing the light leakage. In contrast to the related art in FIG. 12A, in the present invention as shown in FIG. 12B for example, when performing the pre-treatment such as the thermal treatment and performing the secondary alignment process using the UV irradiation on the substrate having the alignment layer that has undergone the primary alignment process, the alignment is accomplished uniformly around the stepped portion of the electrode part, and as a result, no the light leakage occurs.

As described above, the present invention has at least the following advantages. First, in the exemplary system for forming the alignment layer of the LCD device, the rubbing apparatus, the pre-treatment apparatus, and the UV irradiation apparatus are constructed in an in-line type, so that the alignment process can be performed easily and rapidly, thereby improving the production yields. Second, the alignment can be accomplished uniformly around the stepped portion of the electrode part by irradiating UV light after performing the pre-treatment such as the thermal treatment on the rubbed alignment layer of the substrate in the LCD device, thereby enhancing an image quality. Third, the alignment layer is thermally treated to weaken the side chain bond to easily decompose the side chain bond by the UV irradiation, thereby reducing UV irradiation energy and power consumption of a light source, and further reducing manufacturing costs and improving production yields.

It will be apparent to those skilled in the art that various modifications and variations can be made in the system for forming alignment layer of an LCD device and operation method thereof in the present invention. Thus, it is intended that the present invention covers the modifications and variations of this invention provided they come within the scope of the appended claims and their equivalents.

What is claimed is:

1. An operation method of a system for forming an alignment layer of a liquid crystal display device, the operation method comprising:

transferring a substrate on which an alignment layer is placed into a rubbing apparatus;
rubbing the alignment layer on the substrate;
transferring the substrate into a pre-treatment apparatus and thermally treating the substrate;
transferring the substrate into a light irradiation apparatus; and
irradiating light onto the alignment layer on the substrate,
wherein the substrate is heated in the pre-treatment apparatus by at least one heating unit selected from the group consisting of an infrared irradiation apparatus, a coil and a hot pipe,
wherein the rubbing apparatus, the pre-treatment apparatus and the light irradiation apparatus are comprised of an in-line type.

2. The operation method of claim 1, wherein the alignment layer is surface-treated by gas in the pre-treatment apparatus.

3. The operation method of claim 1, wherein the alignment layer is aligned by a polarized light irradiated from the light irradiation apparatus.

4. The operation method of claim 1, wherein the pre-treatment apparatus is provided in a same chamber as the light irradiation apparatus.

5. The operation method of claim 1, wherein the alignment layer includes at least one alignment material selected from the group consisting of polyamic acid, polyethleneimine, polyvinyl alcohol, polyamide, polyethylene, poly-phenylenephthalamide, polyester, polyurethane, and poly-methylmethacrylate.

6. The operation method of claim 5, wherein the alignment layer is aligned perpendicularly to a polarization direction.

7. The operation method of claim 1, wherein the alignment layer includes polystyrene.

8. The operation method of claim 7, wherein the alignment layer is aligned to coincide with a polarization direction.

9. The operation method of claim 1, wherein the pre-treatment apparatus forms a photo initiator on an entire surface of the alignment layer.

\* \* \* \* \*